(12) United States Patent
Rogers

(10) Patent No.: US 10,359,602 B1
(45) Date of Patent: Jul. 23, 2019

(54) ADJUSTABLE MIRROR

(71) Applicant: Sandra Rogers, Lewisville, TX (US)

(72) Inventor: Sandra Rogers, Lewisville, TX (US)

(*) Notice: Subject to any disclaimer, the term of this patent is extended or adjusted under 35 U.S.C. 154(b) by 0 days.

(21) Appl. No.: 16/183,666

(22) Filed: Nov. 7, 2018

(51) Int. Cl.
*G02B 7/182* (2006.01)
*F16M 11/28* (2006.01)
*F16M 11/20* (2006.01)
*F16M 11/10* (2006.01)

(52) U.S. Cl.
CPC ......... *G02B 7/182* (2013.01); *F16M 11/2014* (2013.01); *F16M 11/28* (2013.01); *F16M 11/10* (2013.01); *F16M 2200/08* (2013.01)

(58) Field of Classification Search
CPC .... G02B 7/182; F16M 11/2014; F16M 11/28; F16M 11/10; F16M 2200/08
USPC .......................................................... 359/881
See application file for complete search history.

(56) References Cited

U.S. PATENT DOCUMENTS

| | | | | |
|---|---|---|---|---|
| 631,033 A * | 8/1899 | Wright et al. | ......... | A45D 42/16 248/471 |
| 2,235,282 A * | 3/1941 | Carver | ................... | B60Q 7/005 116/63 P |
| 2,266,977 A * | 12/1941 | Lynch | .................... | A45D 42/12 248/472 |
| 4,339,104 A * | 7/1982 | Weidman | ............... | F16M 11/10 248/407 |
| 5,556,070 A * | 9/1996 | Viebrock | ............... | F16M 11/28 248/469 |
| D444,634 S * | 7/2001 | Dodson | ......................... | D6/312 |
| 6,382,802 B1 * | 5/2002 | Goodman | ............. | A45D 42/16 248/469 |
| D574,159 S * | 8/2008 | Howard | ......................... | D6/310 |
| 8,756,842 B2 * | 6/2014 | Makhija | .................... | G09F 3/20 40/606.14 |
| D751,829 S * | 3/2016 | Yang | .............................. | D6/309 |
| D824,681 S * | 8/2018 | Vaughn | ......................... | D6/309 |
| 2014/0362562 A1 * | 12/2014 | Fung | ....................... | A45D 42/10 362/144 |
| 2017/0164719 A1 * | 6/2017 | Wheeler | ................ | A45D 42/10 |

* cited by examiner

*Primary Examiner* — Collin X Beatty
(74) *Attorney, Agent, or Firm* — Baker Law Firm

(57) ABSTRACT

A two sided mirror and mirror stand includes a central post and a base including plural legs. The mirror resides in a first inner frame and includes a non-magnifying side and a magnifying side. The first mirror frame resides in a second frame and is connected thereto by studs that permit the first frame to pivot from one side to the other. The second frame is connected to a telescopically extendable post. The central post includes a recess configured to store one of the legs in a hide-away position.

1 Claim, 5 Drawing Sheets

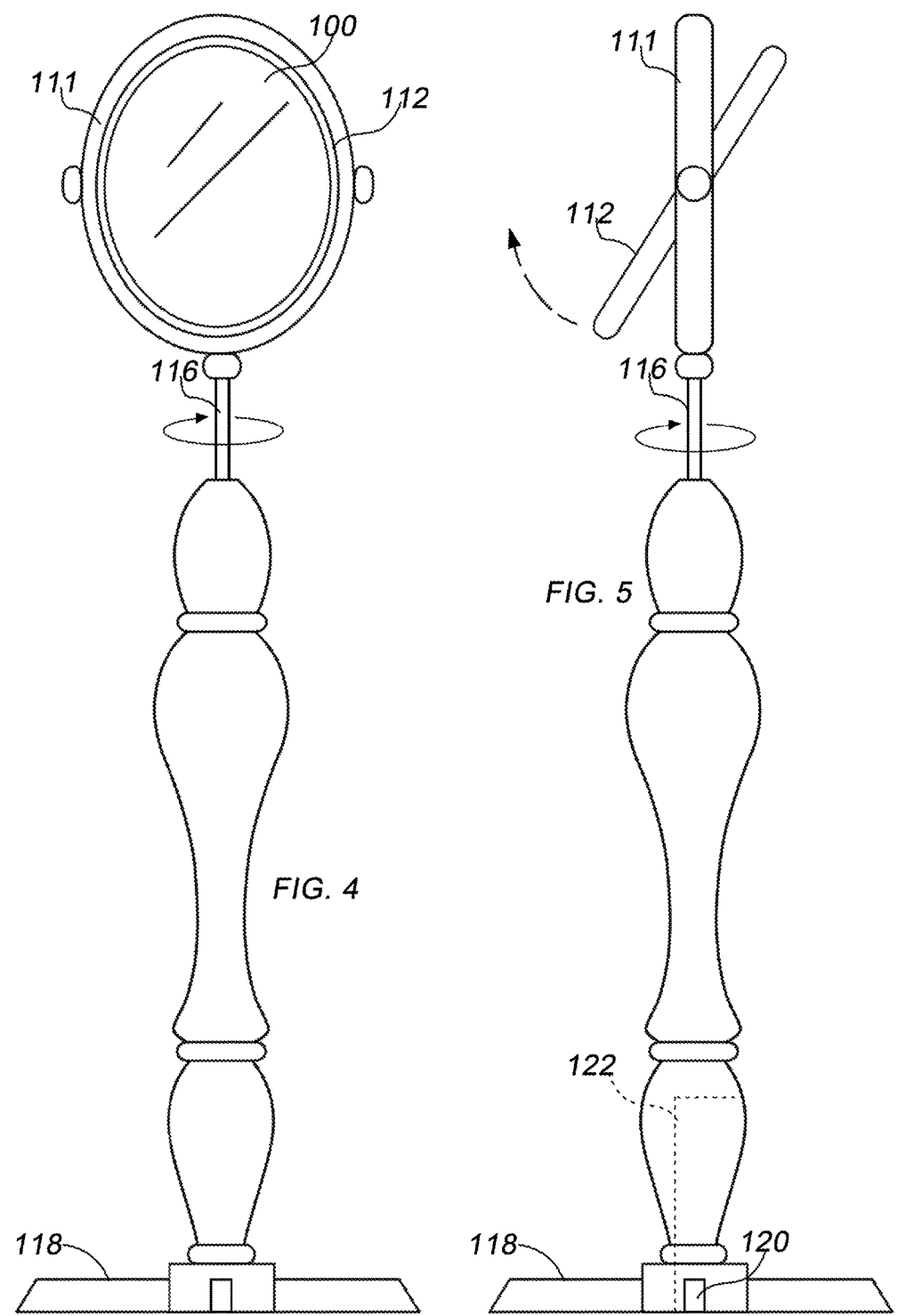

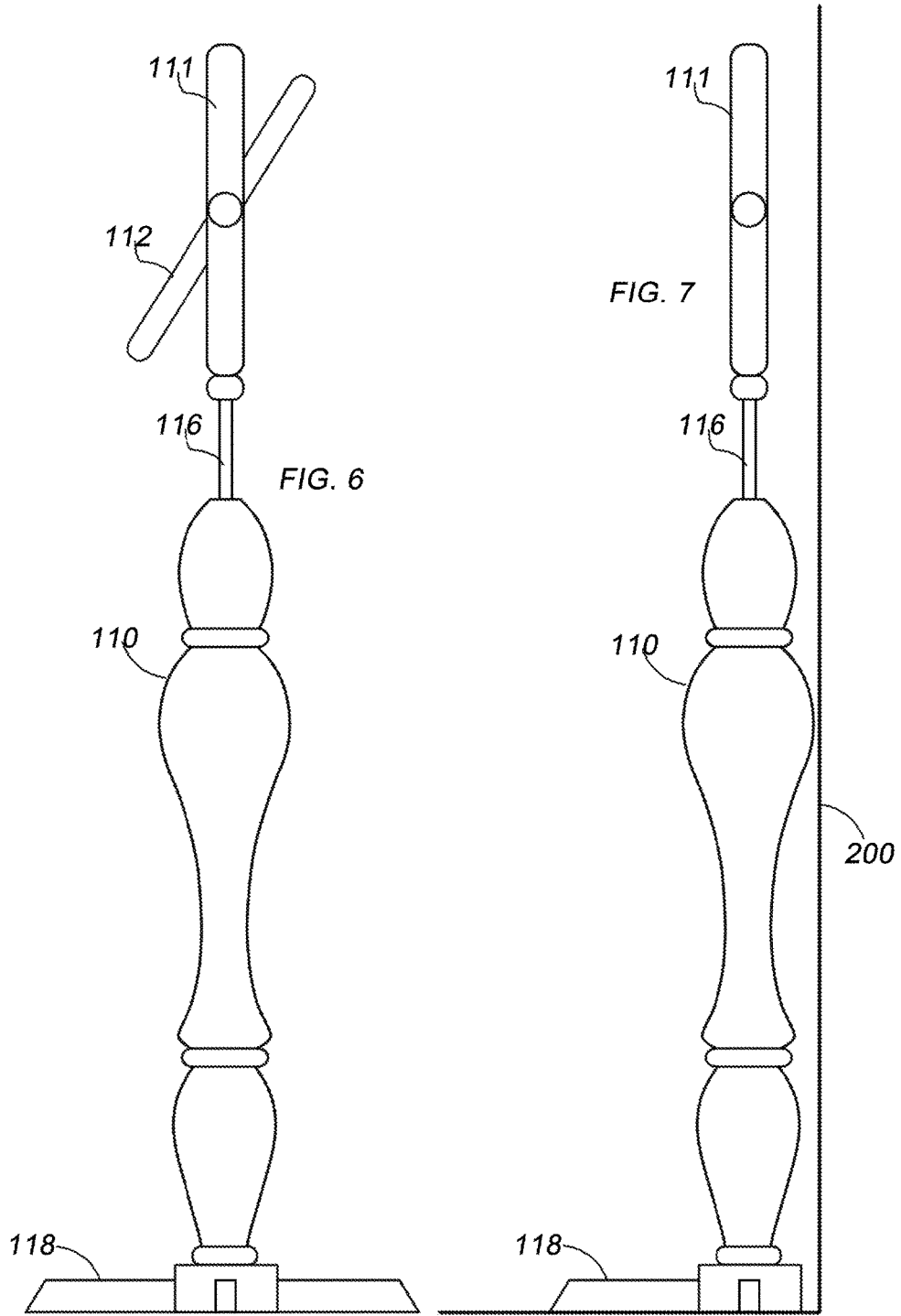

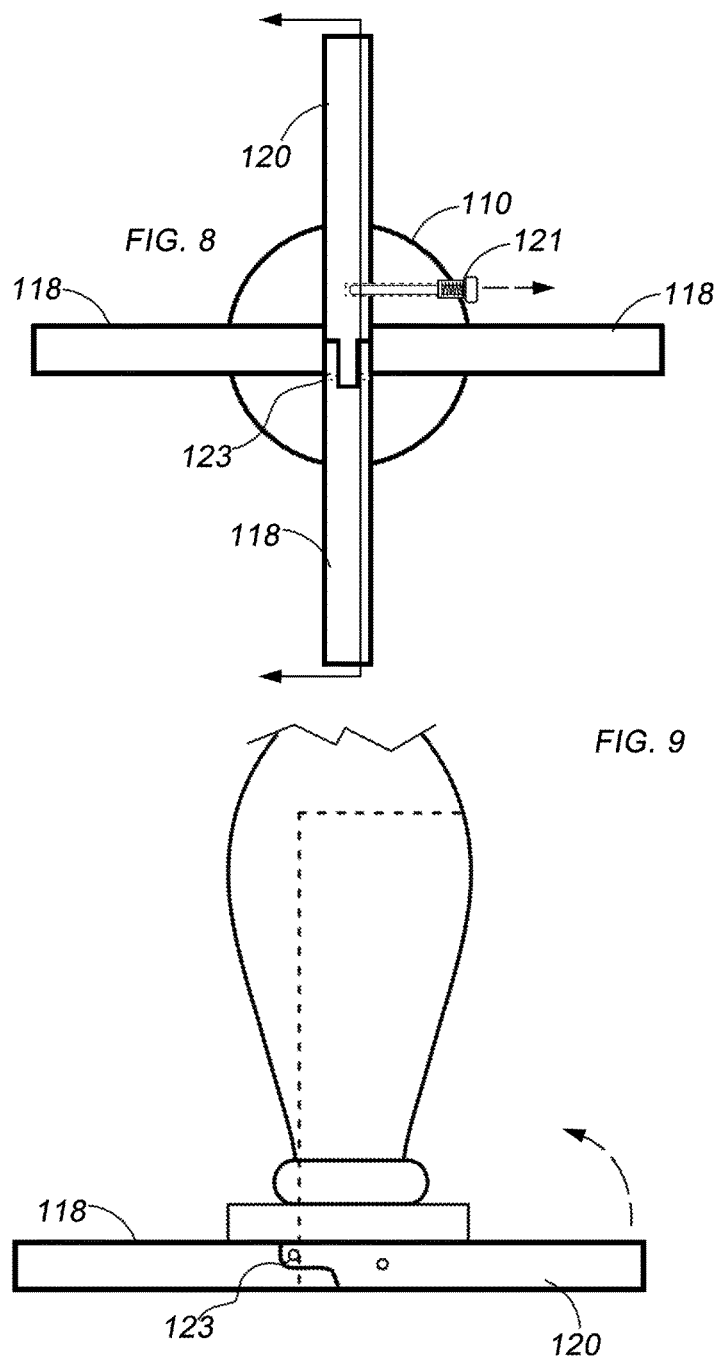

ADJUSTABLE MIRROR

FIELD OF THE INVENTION

This invention relates to mirrors of a type employed by persons for personal grooming. More specifically, the invention relates to a stand supported adjustable mirror.

BACKGROUND OF THE INVENTION

Mirrors and stands adapted for the support thereof are long known in the art. Several adjustable height mirrors have been described in the past that are no doubt suitable for their intended use. However, many of the foregoing mirror stands are somewhat "clinical" in appearance and accordingly, not desirable for young women who may wish for a mirror having a more traditional appearance. Mirror stands of traditional spindle construction while attractive, are typically constrained in adjustability.

What is needed is a mirror stand having the outward appearance of traditional spindle construction, but that successfully incorporates modern functionality.

It would be desirable if the foregoing stand were to include a two sided mirror that may be pivoted from a non-magnifying surface to a greater than 1× magnifying surface.

It would be especially desirable if the foregoing two sided mirror were swivelable 360° atop the stand.

It would be further desirable if two sided mirror were set in a frame that might be telescopically adjustable in height.

It would be particularly desirable if portions of the foregoing stand were pivotable from an exposed state to a hidden state.

SUMMARY OF THE INVENTION

In the present invention, a two sided mirror and mirror stand includes a traditional outward appearance of spindle construction with a central post and a base comprised of at least 3 legs. The mirror resides in a first frame and includes a non-magnifying side and a magnifying side. The magnification of the magnifying side may be any magnification greater than 1×. The first mirror frame resides in a second frame and is connected thereto by studs that permit the first frame to pivot from one side to the other. The second frame is connected to a telescopically extendable post. The telescopically extendable post may be connected to a pneumatic lift or "strut" that may include a gas-charged cylinder that permits the manual extension and retraction of the post and the second frame. The gas-charged cylinder portion of the lift is surrounded by the central post. The telescopically extendable post may retract completely into the central post, or the telescopically extendable post may be partially retractable into the central post. Alternately, the extendable post may be surrounded by friction fit bearings or washers so the post will retain a desired height. At least one of the legs of the base is pivotable so that it may be pivoted to nest in a recess of the central post. The pivotable leg includes a position lock to secure the leg in one of two positions. When the pivotable leg is thus nested, the mirror stand may be moved out of the way, e.g., against a wall.

In some embodiments, inner and outer frames are independently movable about a first shared axis.

In some embodiments, inner and outer frames move together about a second shared axis.

In some embodiments, inner and outer frames move up and down in unison.

In some embodiments a first side of a mirror of the inner frame has a higher magnification than a second side thereof.

In some embodiments, a mirror stand has at least one foldable or retractable leg.

Other advantages of the present invention will become apparent from the following descriptions, taken in connection with the accompanying drawings wherein by way of illustration and example, preferred embodiments of the present invention are disclosed.

BRIEF DESCRIPTION OF THE DRAWINGS

FIG. 4 is a side elevation showing the telescoping post 116;

FIG. 5 is a side elevation showing a rotatable movable post 116 and pivotable mirror frame 112;

FIG. 6 is another side elevation thereof;

FIG. 7 is a side elevation showing one of the legs nested and the stand placed against a wall 200;

FIG. 8 is a detail end view of the stand base showing one exemplary configuration for the pivotable leg;

FIG. 9 is a partial detail view showing one exemplary configuration for a hidden recess adapted to receive a leg;

DETAILED DESCRIPTION OF THE INVENTION

Figure 1:
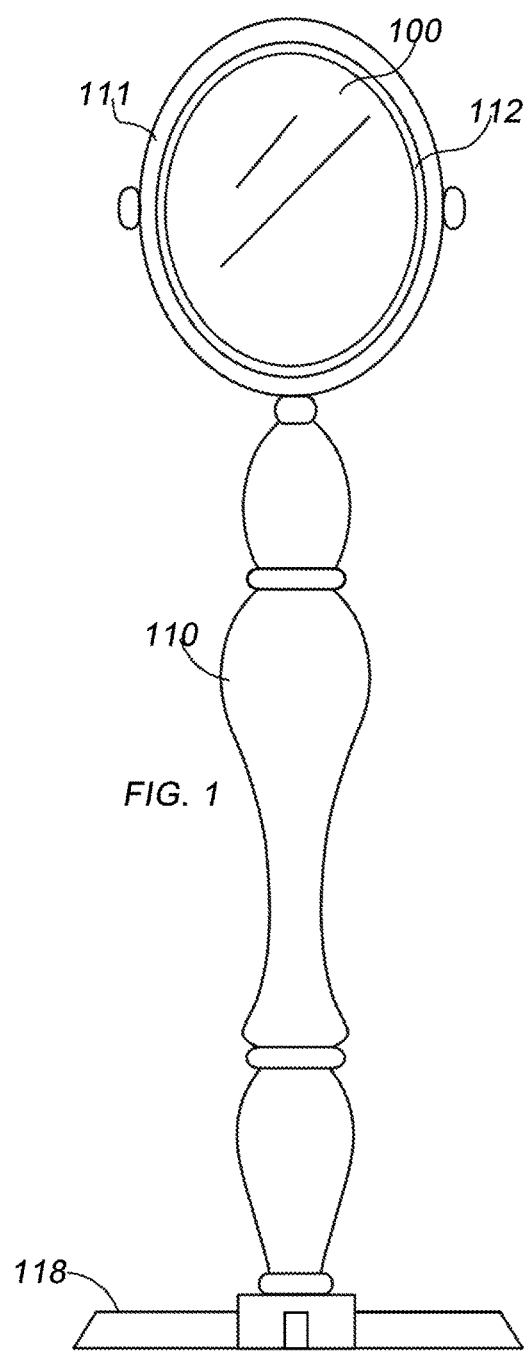
FIG. 1 shows a front side elevation of one embodiment according to the present invention.

Reference Listing:
100 mirror
110 central post
111 outer frame
112 inner frame
116 telescopable post
117 pneumatic spring
118 fixed leg
120 pivotable leg
121 base
122 recess
123 locking pin
124 pivot pin
125 aperture
200 wall
Definitions
Unless otherwise explained, any technical terms used herein have the same meaning as commonly understood by one of ordinary skill in the art to which this disclosure belongs. The singular terms "a," "an," and "the" include plural referents unless the context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. The term "comprises" means "includes." All publications, patent applications, patents, and other references mentioned herein are incorporated by reference in their entirety for all purposes. In case of conflict, the present specification, including explanations of terms, will control. In addition, the materials, methods, and examples are illustrative only and not intended to be limiting. The following description and the drawings sufficiently illustrate specific embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments set forth in the claims encompass all available equivalents of those claims.

Referring generally to FIGS. 1-9, a mirror stand with at least one height and angle adjustable mirror includes a pair or frames; inner and outer, that include a first shared axis and a second shared axis. The first shared axis is coaxial with the columnar stand and both the inner and outer frames are rotatable about the first shared axis. The second shared axis is transverse the first shared axis, and the inner and outer frames are rotatable about the second shared axis. The outer frame is connected to a telescopable post coaxial with the columnar stand, the extension and retraction of the post respectively raises and lowers the pair frames. The post is configured to maintain a set position by either a friction fit or pneumatic means; e.g., pneumatic strut. The inner frame surrounds a first mirror surface and a second mirror surface, the first mirror surface having a 1× magnification (1:1) and the second mirror surface having a magnification that is a multiple; e.g., (1:2, 1:3, 1:4, 1:6, 1:n) of the first surface. The stand includes a base portion that includes plural legs, and wherein at least one of the plural legs are configured to lock in a down position for contact with a floor's surface, and pivot upwardly into the columnar stand in a hide-away position when the stand must be placed against a wall.

FIG. 1 shows a side elevation of an example embodiment of a mirror stand that includes a base (b), plural fixed legs 118, columnar 110, an outer frame 111 and an inner frame 112 and mirror 100a.

Figure 2:
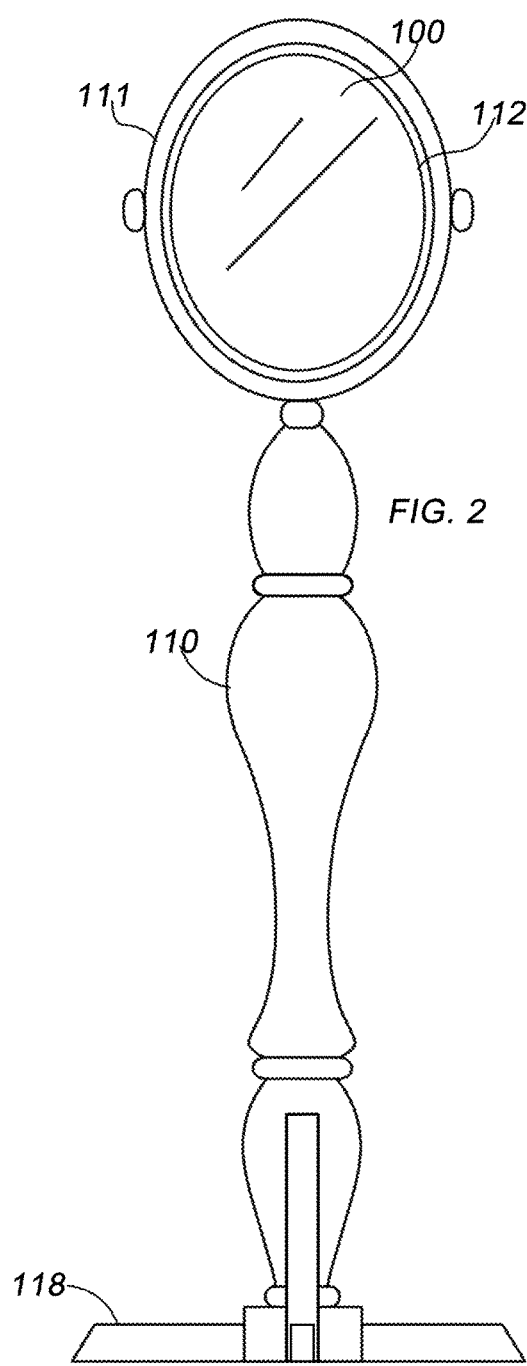
FIG. 2 shows a back side elevation of one embodiment according to the present invention.
Figure 3:
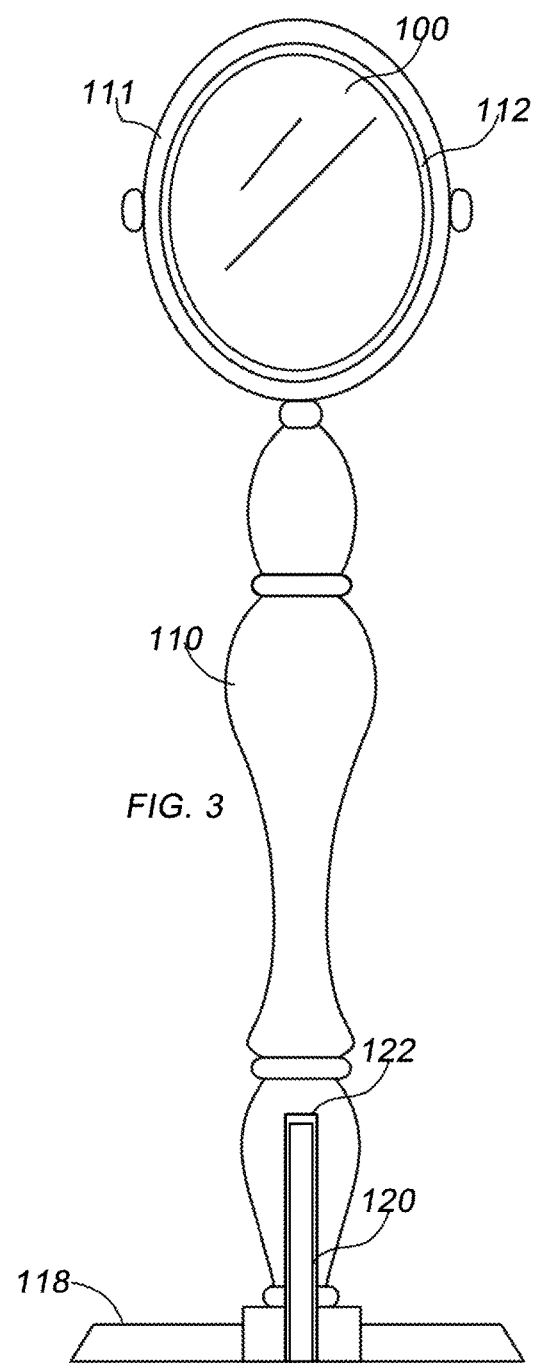
FIG. 3 is a back side elevation showing a nested leg.

FIGS. 2 and 3 show a side elevation of the example mirror stand of (FIG. 1), that includes a recces 122 of the central post 110. In FIG. 2, pivotable leg 120 is in a down position in contact with the floor and in FIG. 3, the pivotable leg 120 is in a raised position inside of recess 122.

FIG. 4 is a side elevation of the example mirror stand that shows the telescopable post 116 in an extended position. Inner 112 and outer frames 111 are rotatable about post 116. FIG. 5 is a side elevation of the example mirror stand that shows the pivotable connection (p) that connects the inner and outer frames and permits the frames to pivot or rotate relative to one another as shown. Also depicted in central stand 110 is a side view of recess 122 that is configured to receive pivotable leg 120.

FIGS. 5 and 6 are side elevations of the example mirror stand and show the relationship of the mirror stand to a vertical surface when the leg 120 is disposed within recess 122.

FIG. 8 is a bottom view of the base that shows the plural legs 118 and pivotable leg 120 which is securable in the down position by spring pin 121 which may be a spring tensioned member that is normally in an extended position and configured to pass through immovable portions of the base and into an aperture of leg 120 thereby holding the leg in a fixed position relative to the base. To release the leg, the spring pin is retracted from the aperture of leg 120.

FIG. 9 is an enlarged side detail view of the base portion showing the relationship of the fixed legs, pivotable leg 120 and recess 122.

Materials for the columnar stand may vary. The overall length of central post 110 may vary. The shape, size and diameter of the central post may vary.

It should be understood that the drawings and detailed description herein are to be regarded in an illustrative rather than a restrictive manner, and are not intended to be limiting to the particular forms and examples disclosed. Accordingly, it is intended that this disclosure encompass any further modifications, changes, rearrangements, substitutions, alternatives, design choices, and embodiments as would be appreciated by those of ordinary skill in the art having benefit of this disclosure, and falling within the spirit and scope of the following claims.

What is claimed is:

1. A mirror stand comprising:
   a mirror mounted to a first frame, the first frame pivotably connected to a second frame, the second frame including a rotatable connection to a telescopically extendable and retractable post;
   a central column includes a first longitudinal recess for the reception of the telescopically extendable and retractable post, and, a second longitudinal recess;
   a base portion connected to the central column, the base portion including at least one pivoting leg configured to move from a position contacting a floor surface to a position within the second longitudinal recess.

* * * * *